(12) United States Patent
Verman et al.

(10) Patent No.: US 7,933,383 B2
(45) Date of Patent: Apr. 26, 2011

(54) X-RAY GENERATOR WITH POLYCAPILLARY OPTIC

(75) Inventors: Boris Verman, Bloomfield, MI (US); Licai Jiang, Rochester Hills, MI (US)

(73) Assignee: Rigaku Innovative Technologies, Inc., Auburn Hills, MI (US)

( * ) Notice: Subject to any disclaimer, the term of this patent is extended or adjusted under 35 U.S.C. 154(b) by 0 days.

(21) Appl. No.: 12/421,907

(22) Filed: Apr. 10, 2009

(65) Prior Publication Data

US 2009/0279670 A1   Nov. 12, 2009

Related U.S. Application Data

(60) Provisional application No. 61/044,148, filed on Apr. 11, 2008.

(51) Int. Cl.
*G21K 1/00* (2006.01)
(52) U.S. Cl. ..................................................... 378/145
(58) Field of Classification Search .................. 378/145, 378/147–149
See application file for complete search history.

(56) References Cited

U.S. PATENT DOCUMENTS

| | | | |
|---|---|---|---|
| 5,175,755 A | 12/1992 | Kumakhov | |
| 5,192,869 A | 3/1993 | Kumakhov | |
| 5,497,008 A | 3/1996 | Kumakhov | |
| 5,570,408 A | 10/1996 | Gibson | |
| 5,604,353 A | 2/1997 | Gibson et al. | |
| 5,745,547 A | 4/1998 | Xiao | |
| 6,041,099 A | 3/2000 | Gutman et al. | |
| 6,333,966 B1 | 12/2001 | Schoen | |
| 6,504,901 B1 | 1/2003 | Loxley et al. | |
| 6,697,454 B1 | 2/2004 | Nicolich et al. | |
| 6,704,389 B1 | 3/2004 | Bievenue et al. | |
| 6,749,300 B2 | 6/2004 | Bjeoumikhov | |
| 6,934,359 B2 | 8/2005 | Chen et al. | |
| 6,935,778 B2 | 8/2005 | Bievenue et al. | |
| 7,023,955 B2 | 4/2006 | Chen et al. | |
| 7,072,439 B2 | 7/2006 | Radley et al. | |
| 7,110,506 B2 | 9/2006 | Radley et al. | |
| 7,209,545 B2 | 4/2007 | Radley et al. | |
| 7,257,193 B2 | 8/2007 | Radley et al. | |
| 7,382,856 B2 | 6/2008 | Radley et al. | |
| 2005/0041773 A1 | 2/2005 | Gibson et al. | |
| 2008/0084967 A1 | 4/2008 | Matsuo | |
| 2008/0159479 A1 | 7/2008 | Huang et al. | |

FOREIGN PATENT DOCUMENTS

EP  0 724 150 A  7/1996
WO  2007/019053 A  2/2007

OTHER PUBLICATIONS

International Search Report—PCT/US2009/040178—(mailed on Jul. 23, 2009).

*Primary Examiner* — Irakli Kiknadze
(74) *Attorney, Agent, or Firm* — Brinks Hofer Gilson & Lione

(57) ABSTRACT

An x-ray generating system includes a source of x-ray radiation, a waveguide bundle optic for collimating the x-ray radiation produced by the source, a focusing optic for focusing the collimated x-ray radiation to a focal point.

18 Claims, 2 Drawing Sheets

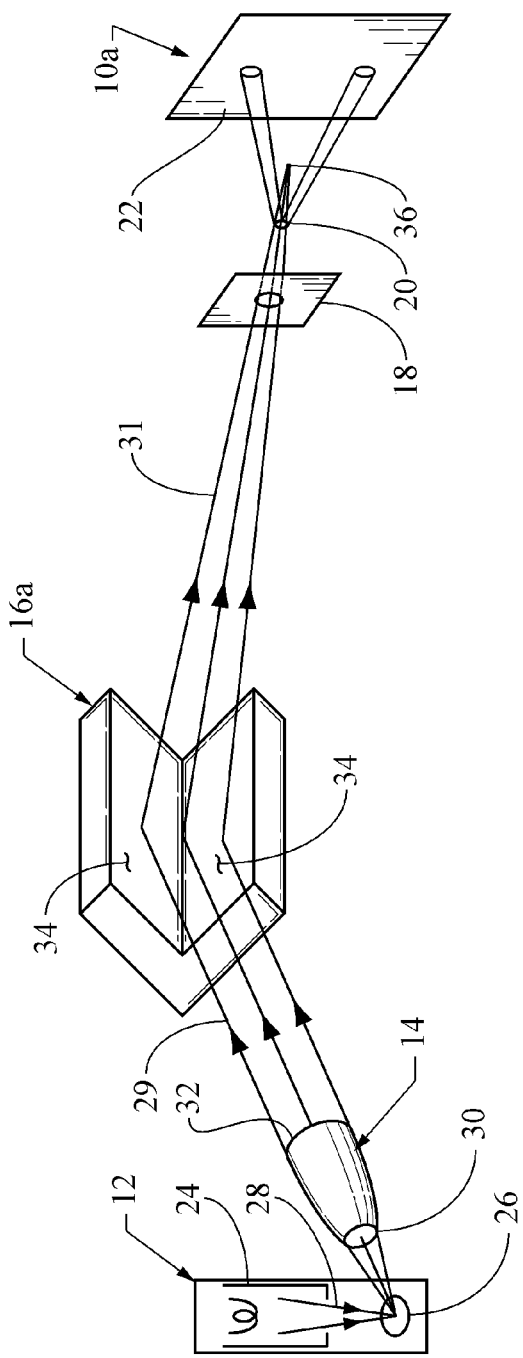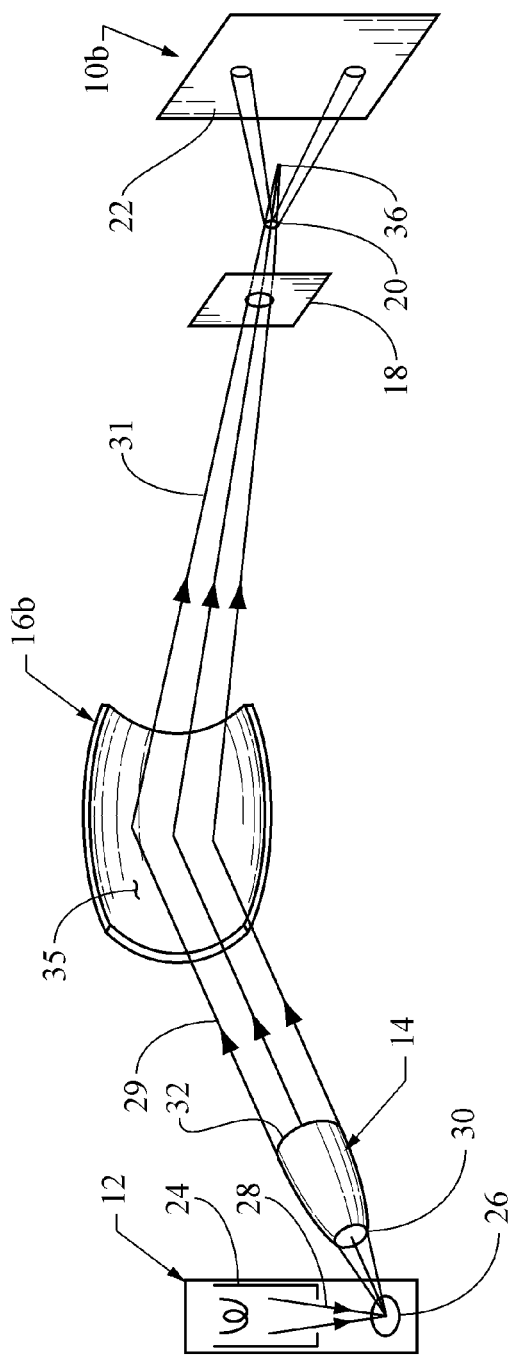

X-RAY GENERATOR WITH POLYCAPILLARY OPTIC

CROSS REFERENCE TO RELATED APPLICATION

This application claims the benefit of U.S. provisional application entitled X-RAY GENERATOR WITH POLYCAPILLARY OPTIC, application No. 61/044,148 filed on Apr. 11, 2008, the entirety of which is hereby incorporated by reference.

BACKGROUND OF THE INVENTION

1. Description of the Related Art

The present invention relates systems for generating and focusing x-ray radiation for analytical instruments including x-ray diffractometry, x-ray spectrometry or other x-ray analysis applications.

2. Description of the Known Technology

There are numerous analytical instruments and procedures for which x-ray radiation is directed onto a target for analytical or metrology applications. Examples of such instruments include those based on the principles of x-ray coherent scattering such as x-ray scattering and x-ray diffraction, and those based on the principle of x-ray fluorescence such as x-ray spectroscopy and x-ray elemental mapping microscopy. In many such applications, there is a need to direct an intense beam of x-rays having controlled beam characteristics in its interaction with the target. These characteristics include spatial definition (divergence, beam size, focal spot size and intensity distribution at different locations), spectrum purity and intensity. However, these characteristic parameters can not be optimized independently. Improving one often comes at price of others. X-rays are inherently difficult to direct. Different technologies have been employed to form x-ray beams. These include total reflection reflectors, optics based on total reflection principle such as capillary and polycapillary made of bundle of micro-sized waveguides, natural crystals, and man-made layered structures called multilayer optics. In some cases, polychromatic radiation with energy spectrum over a relatively wide range may be desired. In other applications, highly monochromitized radiation is desired. Optics are made with selected technologies to match with the beam requirements while maintain an acceptable cost.

X-ray beam systems with excellent performance have been developed with microfocusing sources and variety of beam conditioning optics. Typical focal spot projection of these microfocusing sources is less than 100 micrometers and as small as 10 micrometers. Future development of source technology and optics technology may drive the brilliance even higher and spot size even smaller. Both stability of the spot size and spot position are critical for x-ray beams in analytical applications. In addition to superior performance, microfocusing sources use much less energy therefore has a lower operation cost and cause less environment issues. Sealed tube microfocusing sources, not only offers good performance, but also offers good performance-cost ratio. Representative optics in a microfocusing sources based beam system include multilayer optics, crystal optics, total reflection mirrors, mono-capillary optics and polycapillary optics. Optics can be designed for redirecting x-rays in one direction only, i.e. so-called one-dimensional optics (1D optics), or designed for redirecting x-rays in two perpendicular directions either through single interactions, two interactions or multiple interactions, i.e. so called two-dimensional optics (2D optics). For a highly intense beam, close coupling to an x-ray source is critical in order to acquire a large solid capture angle. To obtain a monochromatic beam, diffraction element should be a key part of the system.

Multilayer optics naturally delivers monochromatic beams. The beam characteristics, such as spatial definition, spectrum purity and intensity, can be optimized through various designs. Multilayer optics have been the major beam conditioning optics for x-ray scattering and diffraction.

In many analyses, such as in x-ray powder diffraction and thin film analysis, the probe beam is conditioned typically by a one-dimensional optic, meaning to redirect and form a beam in one direction only. These optics include planar multilayer optic, parabolic multilayer optic, and elliptical multilayer optic. These optics have a profile of cylinder curve, i.e. the curvature in the direction perpendicular the beam propagation direction is straight line, and the curvature in the direction of beam propagation direction is a profile of either straight line (planar optic), or part of a parabola (collimating optics), or part of an ellipse (focusing optics). These optics are typically very efficient and are capable in delivering high flux beams.

For many other applications, such as single crystal crystallography represented by small molecule crystallography and macro molecule crystallography (protein crystallography), the probe beam has to be a two-dimensional beam, i.e. a "pencil-like" beam formed in two perpendicular directions. Such a beam can be formed by a two-dimensional optic. Multilayer two-dimensional optics are the major beam conditioning optics for the need of two-dimensional beam conditioning. These optics delivers beams with well defined spatial characteristics and good spectrum purity.

Optics based on the waveguide principle, such as waveguide bundle optics represented by polycapillary optics, have been used in x-ray micro-spectrometry and selected x-ray diffraction applications. Comparing to multilayer optics, waveguide bundle optics offer much large capture angle and therefore potentially much higher flux and brilliance. The issue with waveguide bundle optics is that the output, in nature, is x-rays with continuous spectrum and is not suitable for x-ray elastic scattering and x-ray diffraction.

Being able to analyzing small sample is highly important, whether this is because of a local interest on a large sample or acquiring adequate signal strength from small available sample volume. High flux with well defined spectrum and spatial characteristics is often delivered by a focusing multilayer optic. Such an optic could consist of two cylinder elliptical mirrors; each of the mirrors focuses x-rays in one of the two perpendicular directions and the two mirrors are in a so-called Kirkpatrick-Baez geometry, either in sequential or "side-by-side" arrangement as depicted in U.S. Pat. No. 6,041,099. Such an optic could also be part of an ellipsoid with multilayer coating inside, where a single reflection from the optic directing the x-rays in 2-dimensions.

Further improving the intensity of a multilayer focusing optical system depends on close coupling between source and optic. Unfortunately, the coupling distance is limited by the physically feasible dimension of the structure at low d-spacing end. The smallest layer thickness of the man-made layer structure is limited by the size of atoms. At extremely low d-spacing end, such as lower than 10 angstroms, the interlayer roughness is high; the peak reflectivity is low; and rocking curve is narrow.

As it can be seen, none of the solutions discussed above offers efficient coupling with a source and meanwhile provide a beam with controllable and satisfactory spectrum. U.S. Pat. No. 6,504,901 proposed an optical system coupled with a x-ray focusing mirror. But the proposed solution failed to demonstrate that the system will deliver a monochromatic beam and failed to illustrate its efficiency improvement. In fact, the description of the patent leads to a solution which is less efficient and renders an optical scheme without practical significance. The intention seems that using a polycapillary optic to form a small, intense and low divergence "virtual source", the second optic, being a reflector limited with its capture angle, would be able to take the advantage of a source that is the small, more intense and with a lower divergence, and thus deliver a higher flux.

However, from physics law we know, that the first optic, the polycapillary optic, as a kinematical system, i.e. without energy input, will not be able to convert a beam with large divergence into a beam with lower divergence without enlarging the focal spot size of the virtual source. This can also be illustrated by applying thermodynamics to the optical system: the entropy, or the ordering represented by the spot size and divergence, of an isolated system without external energy input will at best be preserved and can not be reduced (or improved in terms of spot size and divergence). The description in U.S. Pat. No. 6,504,901 "polycapillary lens comprises a plurality of tapered capillaries arranged such that both the diameter of the focal spot of an x-ray source and the angular divergence of x-rays are reduced" inevitably results in, in the best case, the same brilliance. Therefore, the performance of the system, in the best case, is equivalent to the performance of the direct coupling between the second optic and the source.

The low efficiency of the proposed system in U.S. Pat. No. 6,504,901 could also be illustrated in an geometrical manner, as well. The mechanism of x-ray photons propagation through a single capillary is multiple external total reflection. It occurs in a quite small range of incident angles, which is below 0.3 degrees for the wave length commonly used for diffraction experiments. A collimating waveguide bundle optic, as depicted in FIG. 3, has a smaller cross section at a distance closer to the source. For an x-ray photon propagating inside a capillary, the incident angle at capillary wall gets smaller with each consecutive total reflection. On the other hand, if the optic is a focusing optic, the reflection angle gets smaller at first until the x-ray photons reach the point with largest diameter of the polycapillary optic, then gets larger with each consecutive reflection after passing the point with maximum diameter. When photons reach the exit of the proposed optic in the patent "bottle-shaped" optic where capillary diameter is smaller than at optic entrance, some portion of them will have incident angle larger than critical angle of external total reflection and will be lost, reducing optical system efficiency.

BRIEF SUMMARY

In satisfying the above need, as well as overcoming the enumerated drawbacks and other limitations of the related art, the present invention provides an improved x-ray generating system. The x-ray generating system includes a source of x-ray radiation, a waveguide bundle based optic, such as polycapillary optic, for collecting the x-ray radiation produced by the source at large capture angle, a focusing diffractive optic for capturing beam from the first optic and focusing the monochromatic x-ray radiation to a focal point.

For avoiding the issues identified previously for the focusing polycapillary optic, the waveguide bundle optic should be designed in such a fashion that it provides a divergent beam, a collimated beam, or a slightly convergent beam.

Generally, the focusing optic can be a Kirkpatrick-Baez side-by-side optic having multilayer Bragg x-ray reflecting surfaces that may be either laterally or laterally and depth graded. The focusing reflector can be parabolic, elliptic, and hyperbolic cylinder surfaces. The focusing optic can also be a doubly curved optic, such as paraboloidal, ellipsoidal, hyperboloidal, and toroidal optics, having multilayer Bragg x-ray reflecting surface that may be either laterally or laterally and depth graded.

The coupling between the waveguide bundle optic and the diffractive optic is in such a way that the geometric focus of the diffractive optic is at the virtual focus of the waveguide bundle optic or the other way around. If the waveguide bundle optic is a collimating optic, the diffractive optic will be a parabolic or parabloidal optic having its focus at infinite; if the waveguide bundle optic delivers a divergent beam, the diffractive optic will be an elliptical or ellipsoidal optic having its geometric focus at the virtual focus of the divergent beam delivered by the waveguide bundle optic; if the waveguide bundle optic delivers a slightly focused (convergent) beam, the diffractive optic will be hyperbolic and hyperboloidal optic.

The x-ray system in accordance with this invention seeks to overcome the previously described design challenges of the prior art by providing a waveguide bundle based optical element closely coupled with an x-ray source which captures x-ray radiation from the source at a large capture angle and directs it to a further diffraction element in a controlled beam size and desired ray configuration. For example, collimated beam configurations can be readily provided. Through the use of suitable additional diffraction optics, such as the previously mentioned Kirkpatrick-Baez multilayer parabolic optic or an paraboloidal optic, a beam with substantially high intensity can be acquired.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 1 illustrates an x-ray generating system having a waveguide bundle optic, such as polycapillary optic, and a Kirkpatrick-Baez side-by-side multilayer optic;

FIG. 2 illustrates an x-ray generating system having a waveguide bundle optic (such as polycapillary optic) and a doubly curved multilayer optic.

DETAILED DESCRIPTION

Figure 3:
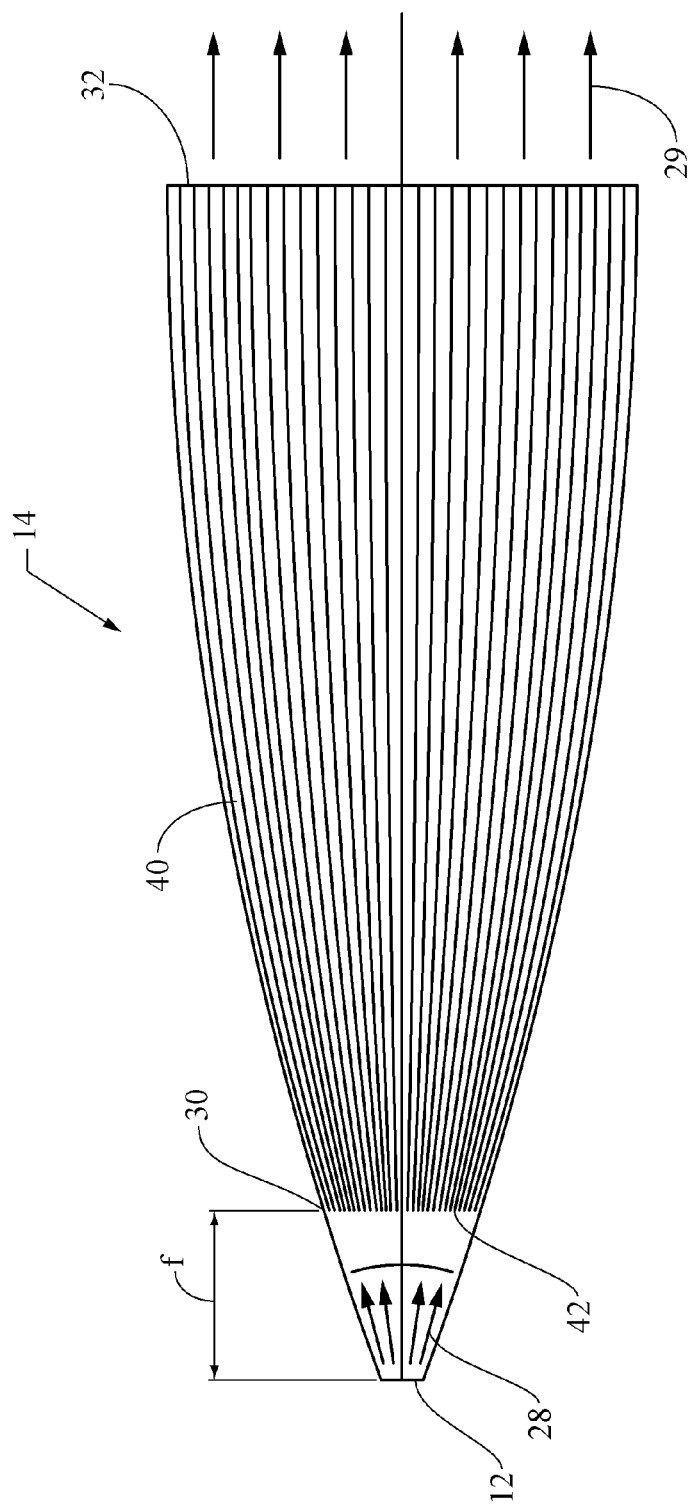
FIG. 3 illustrates a more detailed view of the waveguide bundle optic of FIGS. 1 and 2.

An x-ray analysis system 10a includes an x-ray source 12, a waveguide bundle optic (such as polycapillary optic) 14, a focusing optic 16a, an aperture 18, a sample 20, and an x-ray detector 22. The x-ray source 12 may be a laboratory source, such as a high brilliance rotating anode x-ray generator or a sealed tube microfocusing source. The x-ray source 12 generally includes an electron beam focusing system 24 and a target 26. Electron beam 28 is guided to the target 26 by the e-beam focusing system 24.

The waveguide bundle optic 14 includes an input 30 and an output 32. The input 30 of the waveguide bundle optic is generally located about 3 mm to 15 mm, but not limited to, from the focus of the x-ray source 12. This distance between the input 30 of the waveguide bundle optic 14 and x-ray source 12 is better known as the focal distance. Once x-rays are received by the input 30 of the waveguide bundle optic 14, the waveguide bundle optic 14 guides the x-rays from its input to its output. The x-rays leaving the output 32 of the waveguide bundle optic are divergent, parallel, or slightly convergent.

The focusing optic 16a in this embodiment is a Kirkpatrick-Baez side-by-side optic having multilayer Bragg x-ray reflecting surfaces 34 as described in U.S. Pat. No. 6,041,099, which is herein incorporated by reference. The Bragg x-ray reflecting surfaces 34 generally have graded-d spacing that is either lateral or lateral and depth graded.

The x-rays 29 received by the Bragg x-ray reflecting surfaces 34 of the focusing optic 16a are then reflected by the Bragg x-ray reflecting surfaces 34 to a focal point 36. The surface shape of the mirrors of the diffractive optic depends on the design of the first waveguide bundle optic. If the first optic provides a divergent beam, the surfaces of the mirrors have an elliptical shape. If the first optic forms a collimating beam, the surfaces of the mirrors have a parabolic shape. If the first optic provides slightly focusing beam, the surfaces of the mirrors have an hyperbolic shape. In any combination, the diffractive optic is positioned in such a way that the virtual focus of one of optics coincides with the real focus of other optic. This condition is critical and provides an effective acceptance by the diffractive optic of all the rays from the waveguide bundle optic. The reflected x-rays by the diffractive optic x-rays 31 are further defined by the aperture 18 in order to remove any unnecessary x-rays. The sample 20 is located adjacent to the focal point 36 and receives the reflected x-rays 31 shaped by the aperture 18. The sample 20 may be any sample, such as a biological sample, a polymer, or a crystallized protein, whose structure is the interest of study. The x-rays altered by the sample are captured by an x-ray detector 22.

Referring to FIG. 2, another x-ray generating system 10b is shown. The x-ray generating system 10b is similar to the x-ray generating system 10a in FIG. 1, however, the focusing optic 16b of the x-ray generating system 10b differs from that of the focusing optic 16a of the x-ray generating system 10a. In this embodiment, the focusing optic 16b is a doubly curved optic, such as an ellipsoidal, paraboloidal or hyperboloidal optic, having multilayer Bragg x-ray reflecting surface. Additionally, the multilayer Bragg reflecting surface 35 of the reflecting optic 16b has graded-d spacing that may be laterally graded or laterally and depth graded.

Similar to the embodiment shown in FIG. 1, the pre-conditioned x-rays 24 from the output 32 of the waveguide bundle optic, or polycapillary optic, 14 are reflected by the diffractive optic 16b. The reflected x-rays 31 are then focused on a focal point 36. The sample 20 is located near the focal point 36 and is configured to receive the reflected x-rays 31. Thereafter, a detector 22 receives x-rays that have traveled through the sample 20 or are scattered or diffracted by the sample 20.

Referring to FIG. 3, a more detailed illustration of the waveguide bundle optic 14, such as a polycapillary optic, is shown. The source 12 emitting the x-rays 28 are separated from the input 30 of the waveguide bundle optic 14 by a distance f, known as the focal distance. As stated previously, the focal distance f is generally between about 3 millimeters to 15 millimeters but not limited to.

The waveguide bundle optic 14 includes a plurality of hollow waveguides 40 which are bundled together and plastically shaped into configurations which allow efficient capture of divergent x-rays emerging from the x-ray source 12. In this example, the captured x-rays 28 are shaped by the waveguide bundle optic 14 into the collimated x-rays 29. Channel openings 42 located at the input 30 of the waveguide bundle optic 14 are pointing at the x-ray source 12. The optic could be shorter than shown on the FIG. 3 providing divergent beam, or it could be longer providing a slightly convergent beam. In any of the described embodiments, the diameters of the individual channel openings 42 at the input 30 of the waveguide bundle optic 14 is smaller than the channel diameters at the output 32.

Generally, the hollow waveguides, or capillaries, 40 are made of glass and have a diameter ranging from a few micrometers to sub-millimeters. However, the hollow capillaries may be made from carbon nanotubes with even smaller diameter of the channels.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. An x-ray generating system comprising:
a microfocusing source of x-ray radiation;
a waveguide bundle optic for capturing the x-ray radiation produced by the microfocusing source, the waveguide bundle optic having an input for receiving x-ray radiation from the microfocusing source and an output for outputting a collimated, or convergent x-ray beam;
a diffractive optic with a diffractive reflection surface for focusing the x-ray beam from the wave guide bundle optic to a focal point; and
wherein a sample receives radiation from the diffractive reflection surface, the sample being located adjacent to the focal point.

2. The system of claim 1, wherein the waveguide bundle optic is a polycapillary optic.

3. The system of claim 1, wherein the said focusing optic is a Kirkpatrick-Baez side-by-side optic having multilayer Bragg x-ray reflecting surfaces.

4. The system of claim 3, wherein the said Kirkpatrick-Baez-Baez side-by-side optic has two elliptical reflectors.

5. The system of claim 3, wherein the said Kirkpatrick-Baez-Baez side-by-side optic has two parabolical reflectors.

6. The system of claim 3, wherein the said Kirkpatrick-Baez-Baez side-by-side optic has two hyperbolical reflectors.

7. The system of claim 3, wherein the said multilayer Bragg x-ray reflecting surfaces have graded-d spacing.

8. The system of claim 7, wherein the graded-d spacing is laterally graded.

9. The system of claim 7, wherein the graded-d spacing is both laterally graded and depth graded.

10. An x-ray generating system comprising:
a microfocusing source of x-ray radiation;
a waveguide bundle optic for capturing the x-ray radiation produced by the microfocusing source, the waveguide bundle optic having an input for receiving x-ray radiation from the source and an output for outputting a collimated, or convergent x-ray beam;
a diffractive optic with a diffractive reflection surface for focusing the x-ray beam from the wave guide bundle optic to a focal point;
wherein the waveguide optic is a bundle of carbon nanotubes; and
wherein a sample receives radiation from the diffractive reflection surface, the sample being located adjacent to the focal point.

11. The system of claim 1, wherein the said focusing optic is a doubly curved optic having multilayer Bragg x-ray reflecting surface.

12. The system of claim 11, wherein the said doubly curved optic has an ellipsoidal surface.

13. The system of claim 11, wherein the said doubly curved optic has a paraboloidal surface.

14. The system of claim 11, wherein the said doubly curved optic has a hyperboloidal surface.

15. The system of claim 11, wherein the said multilayer Bragg x-ray reflecting surfaces have graded-d spacing.

16. The system of claim 15, wherein the graded-d spacing is laterally graded.

17. The system of claim 15, wherein the graded-d spacing is both laterally graded and depth graded.

18. The system of claim 1, further comprising an aperture for removing unused portions of the x-ray radiation, the aperture located between the said focusing optic and the focal point.

* * * * *